3,218,122
PURIFICATION OF FERRIC CHLORIDE
Earl William Nelson, Lynchburg, Va., Millard Corbett Godwin, Savannah, Ga., and Thomas James Crossley, Amherst, Va., assignors to American Cyanamid Company, Stamford, Conn., a corporation of Maine
Filed May 22, 1963, Ser. No. 282,447
8 Claims. (Cl. 23—87)

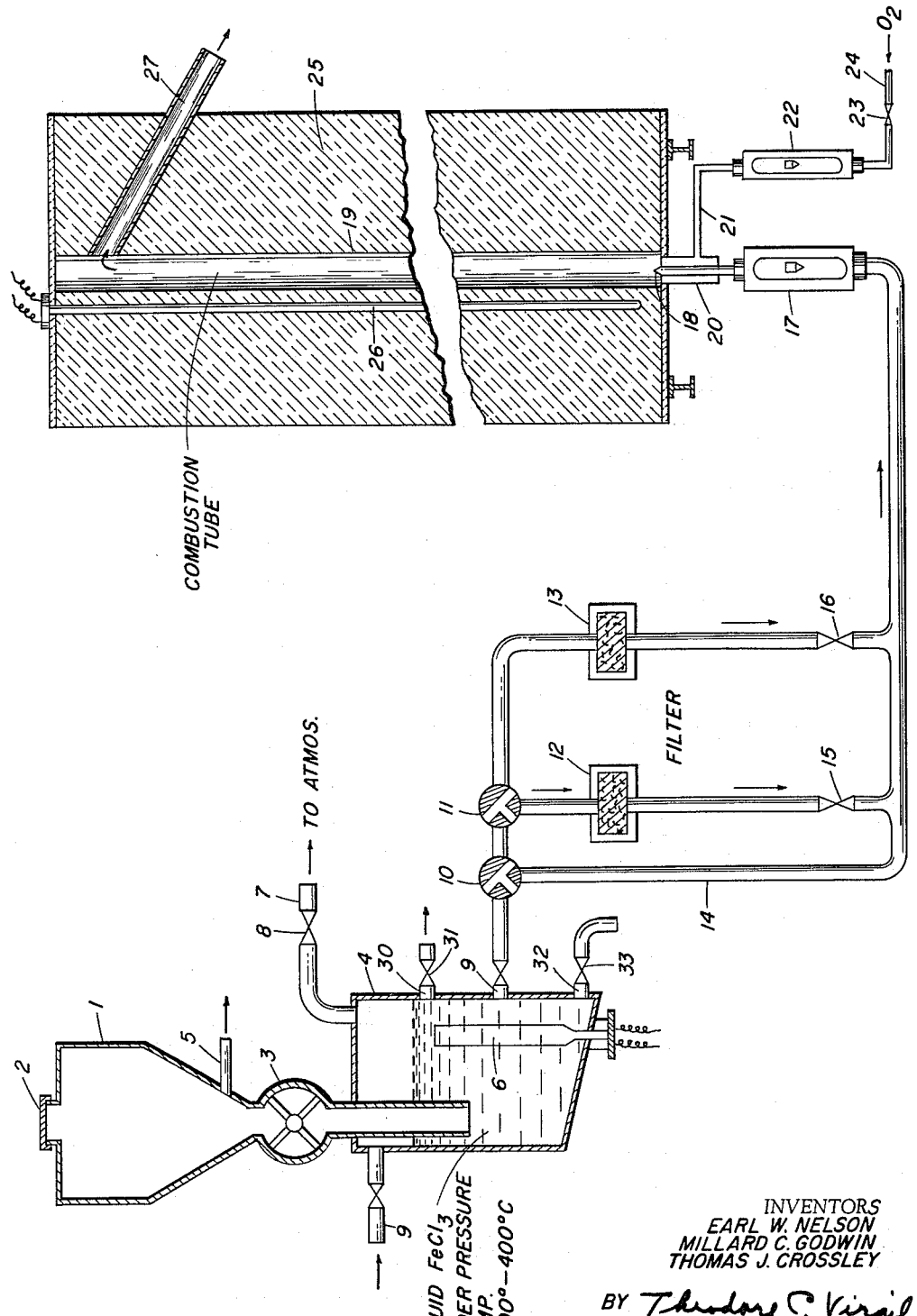

This is a continuation-in-part of co-pending application Serial No. 844,452, filed October 5, 1959 now abandoned.

This invention relates to a method of purifying ferric chloride contaminated with non-fusible solid materials, and it also pertains to the use of the purified ferric chloride for the production of chlorine by the oxidation reaction.

At the present time ferric chloride is produced in large amounts as an incident to the production of titanium tetrachloride by chlorination of an oxidic titaniferous material, viz., usually ilmenite ore or slag derived therefrom, in the presence of a reducing agent, usually coke. The off-gas from the chlorinator is a gas at 700°–900° C. consisting essentially of titanium tetrachloride, unreacted chlorine, ferric chloride, and ferrous chloride. When the chlorination is performed under fluidization conditions, the off-gas may carry in suspension finely divided unreacted titaniferous material and the reducing agent. The titanium tetrachloride is recovered by cooling the off-gas to about 200° C.; scrubbing the gas to remove the iron chlorides and the suspended titaniferous material and coke, and further cooling the gas to condense the titanium tetrachloride. The ferric chloride which is separated from the titanium tetrachloride may usually contain ferrous chloride, carbonaceous material or coke, unreacted titaniferous ore or titanium dioxide containing material, silica, etc. The presence of these impurities is undesirable, especially when the iron chlorides are employed as feed materials to the oxidation reaction in which the chloride is converted to iron oxide and elemental chlorine.

The process of manufacturing titanium tetrachloride is a continuous or cyclic one, in that, the chlorine is recovered by the combustion of the titanium tetrachloride and the iron chloride or chlorides, and is recycled to the chlorinator. The combustion of the ferric and ferrous chlorides follows the theoretical equations:

(1) $\quad 2FeCl_3 + 1\tfrac{1}{2}O_2 \rightleftharpoons Fe_2O_3 + 3Cl_2$
(2) $\quad 3FeCl_3 + 2O_2 \rightleftharpoons Fe_3O_4 + 4\tfrac{1}{2}Cl_2$
(3) $\quad 2FeCl_2 + 1\tfrac{1}{2}O_2 \rightleftharpoons Fe_2O_3 + 2Cl_2$ and (4) $\quad 3FeCl_2 + 2O_2 \rightleftharpoons Fe_3O_4 + 3Cl_2$ In the past it has been proposed to recover the chlorine content of the iron chlorides by burning the iron chlorides in finely divided solid form with oxygen (see Sawyer U.S. Patent No. 2,642,339 granted in 1953). A disadvantage of this process is that it does not permit recovery of unreacted titaniferous material and coke. This is an important disadvantage as the two materials are often present in significant amounts. Moreover, since the iron oxide produced by the combustion is often contaminated with titanium dioxide, its value as a starting material for steel-making purposes is decreased. Further, combustion of the coke with the iron chloride material produces carbon dioxide which dilutes the chlorine and ultimately must be removed therefrom.

It has also been proposed to recover the chlorine from the iron chlorides by burning the chlorides in the vapor phase with oxygen (see Lane U.S. Patent No. 2,653,078 granted in 1953). A disadvantage of this method is that incrustations tend to form on the burner tips so that special provision for cooling the tips must be provided. Moreover, the ferrous chloride which is usually present tends to coat the surface of the heat transfer elements so that plugging of the apparatus ultimately occurs.

The present invention is concerned with the purification of solid ferric chloride contaminated with $TiO_2$ and coke by the process which comprises liquifying the ferric chloride and separating therefrom a significant amount of the coke and $TiO_2$.

We have discovered that when the ferric chloride is melted, the impurities tend to segregate in a manner which permits their easy separation from the mass of the molten $FeCl_3$. The coke impurity rises to the upper part of the molten ferric chloride, whereas the $TiO_2$ impurity settles to the bottom and thus can be withdrawn. Surprisingly, the impurities do migrate sufficiently within the ferric chloride in a melted state to make possible the practice of this invention.

The ferric chloride may contain 1 to 20% by weight of impurities of the type described above, and more usually about 7 to 15% by weight, based on the iron chloride content. Ferrous chloride may also be present with the ferric chloride in widely varying proportions, i.e., generally about 2 to 100% by weight, more usually about 10 to 35% by weight, based on the ferric chloride. The ferrous chloride presents no difficulties in the present operation, because it readily dissolves into the ferric chloride, unlike what happens when ferric chloride is fed either as a solid or vapor to the oxidation reaction.

The ferric chloride is heated to a temperature of at least about 305° C., or at least about 315° C., and usually about 305° to 475° C. or higher, or still more usually about 310° to 360° C. to attain a melted condition. At such temperatures, the ferric chloride is sufficiently molten to permit the separation of impurities therefrom.

The coke material is withdrawn from the upper part or surface of the melted ferric chloride by simple decantation or withdrawal, whereas the $TiO_2$ impurity collects in the bottom part of the melted ferric chloride and may be withdrawn. The relatively purer ferric chloride is withdrawn from the middle part of the melted body of material. The coke and $TiO_2$ impurities which have been separated from the melted $FeCl_3$ body may be recycled to the chlorinator in which $TiO_2$ is chlorinated to $TiCl_4$ in the presence of coke, in order to improve the ore and coke utilization. Any $FeCl_3$ and/or ferrous chloride contained with the impurity streams are likewise returned to the chlorinator and subsequently recovered.

The settling time for the melted ferric chloride body to effect separation of the impurities can be reasonably rapid after the ferric chloride has become completely melted. Generally, the residence time of the ferric chloride in the melter is about 0.5 to 10 hours, more usually, about 1 to 3 hours. The same residence time is applicable for the period of time which may elapse before the impurities are withdrawn from the melted ferric chloride.

It has also been found that the use of iron chlorides in a melted state is beneficial to the process for converting iron chloride to iron oxide and chlorine. The method has a number of substantial advantages, which are enumerated below.

(1) The ferric and/or ferrous chlorides are handled as a liquid, thereby avoiding the difficulties inherent in the transportation and metering of finely-divided solids and gases.

(2) The method does not require any pumping means. The viscosity of molten iron chloride is sufficiently low that it flows easily under the pressure autogenously developed by the iron chloride in the range 315°–350° C., and its viscosity remains low even though it may be carrying substantial amounts, up to about 20% by weight, of finely divided suspended insoluble material.

(3) The method works well with a ferric chloride material containing the impurities such as ferrous chloride, coke, slag, ilmenite, silica, etc. in the amounts specified hereinabove.

(4) The method permits any insoluble impurities present to be removed easily and recycled. Moreover, normally soluble impurities (to the extent that they are present in excess over the dissolving capacity of the ferric chloride therefor) can be separated in the same manner. The process thus permits any unreacted oxidic titaniferous material and reducing agent present to be recycled.

(5) Formation of iron oxide incrustations on the iron chloride inlet orifice is minimized. The iron chloride, being admitted as a liquid, does not react until volatilized, and this does not occur until the iron chloride is clear of the burner tip.

The invention will be more particularly described with reference to the drawing, which illustrates schematically one form of apparatus suitable for performance of the process of the present invention.

In the drawing, numeral 1 designates a substantially gas-tight hopper for receiving the iron chloride feed. The hopper is provided with a removable lid 2 and is positioned over a substantially gas-tight star-feeder 3 so that the iron chloride feed is delivered to a liquefaction chamber 4. The hopper is provided with a vent pipe 5 for discharge of gas which passes through the star feeder 3. Liquefaction chamber 4 is provided with a high-capacity electric heater 6 by which the contents of the chamber are kept molten or in liquid form. The chamber 4 also contains a vent 7 which has a safety valve 8 for preventing the development of excessively high pressure, which may result from the admission of feed wet with titanium tetrachloride. The chamber 4 further contains a valved pressure line 9 whereby an inert gas may be introduced under pressure into the liquefaction chamber, thereby augmenting the pressure autogenously developed therein. For a continuous operation, two liquefaction chambers and a supply hopper for each may be used.

The liquefaction chamber 4 is provided with an outlet control valve 9 and two three-way valves 10 and 11 so that product from the chamber can be discharged through filters 12 and 13, if desired, or it may be-passed therearound through pipe 14. Valves 15 and 16 permits filters 12 and 13 to be shut off while the feed is being passed through line 14. The product passes through a flowmeter 17 and a circular spray nozzle 18 and thence into a combustion tube 19 in which is present a fluid bed of iron oxide. Spray nozzle 18 is surrounded by a circular oxygen supply pipe 20, which in turn is connected through line 21 to a rotometer 22, shut-off valve 23 and pipe 24 to a source of oxygen.

Combustion tube 19 is encased in thermal insulation 25 and is surrounded by four controllable electric heaters of which heater 26 is illustrative. The combustion tube discharges through a tube 27, which slopes downwardly at an angle of 45°.

The temperature of the ferric chloride in the liquefaction chamber 4 is sufficiently high to maintain the same in a liquid condition. The coke impurity rises to the surface of the ferric chloride melt and is withdrawn therefrom through a line 30 in which is installed a valve 31. The coke impurity and iron chlorides contained with it are passed to chlorinator (not shown) in which $TiO_2$ containing material is chlorinated with chlorine in the presence of coke. The $TiO_2$ impurity settled to the bottom of the liquefaction chamber 4 and may be withdrawn through a line 32 in which is installed a valve 33. This stream of $TiO_2$ impurity and any iron chlorides with it are either combined with the coke impurity and passed directly to the chlorinator or sent directly thereto without being combined with the coke impurity.

To prepare the apparatus for operation, all valves are closed and liquefying chamber 4 is charged to about two-thirds of its capacity with ferric chloride feed from hopper 1. Electric heater 6 is then turned on and the charge heated until it has reached a flowable viscosity. At the same time, combustion tube 19 is heated to a combustion temperature, for example 700° C., by electric heaters exemplified by heater 26. Oxygen is admitted in a predetermined amount through pipe 20. If desired, inert gas may be supplied through line 9 to augment the pressure autogenously developed in the liquefaction chamber. The three-way valves 10 and 11 are then closed, thus placing line 14 in service. Ferric chloride feed in liquid form is thus introduced into the combustion chamber 19.

For continuous operation the flow of oxygen and iron chloride are adjusted to the desired combustion ratio such as for example a substantial stoichiometrical equivalence, and the temperatures and the pressures of the entering reactants will be varied so as to obtain maximum throughput or conversion.

The reaction does not go to completion and the product discharged through tube 27 is an equilibrium mixture of ferric oxide contained in a gaseous suspension of chlorine, unreacted iron chloride and unreacted oxygen. This suspension is delivered to a conventional product recovering system (not shown) where the iron oxide alone is removed by a cyclone separator or bag filter, and the remaining gases are separated by known means.

Ferric chloride which is obtained from the chlorination of ferrotitaniferous material contains a minor amount of ferrous chloride, a material which melts at about 672° C. but which is very soluble in molten ferric chloride. According to the present invention the mixture is heated in the liquefying chamber until substantially all or all of the ferric chloride has melted. The liquid phase thus consists of ferric chloride having dissolved therein a substantial amount of ferrous chloride. A suitable means for determining the temperature at which development of a pumpable viscosity occurs is shown in the example hereinbelow.

It is not difficult to form a completely molten or liquid mixture of ferric chloride. Ferric chloride containing 20% by weight of ferrous chloride becomes molten at about 330° C., so that mixtures containing less than that amount of ferrous chloride are easily handled. Ferric chloride containing 25% by weight of ferrous chloride becomes molten at a higher temperature of about 360° C. However, even when the weight of ferrous chloride is equal to (that is, 100%) the weight of the ferric chloride, the mixture liquefies at about 475° C., a temperature at which it is handled without undue difficulty. In each instance, liquid masses of pumpable viscosity are reached at lower temperatures.

The ferric chloride mixture is introduced directly into the combustion chamber along with oxygen for combustion. The mixture may be introduced at the temperature at which it is discharged from the liquefying chamber or may be preheated to a higher temperature to supply additional heat to the reactor. It may be introduced as plug-flow through the pipe in which it is conveyed. The ferric chloride volatilizes in part rapidly upon release of the pressure. Preferably, however, it is introduced into the chamber as a spray through a conventional spray head fitted to the pipe.

The combustion chamber, which may be a tube, is at a combustion temperature, i.e., within the range 500° C.–1000° C., while the ferric chloride mixture is introduced. When an appreciable amount of ferrous chloride is present, a temperature at 700° C. or higher may be more advantageous. The combustion is exothermic but only slightly so. A suitable temperature is maintained by the use of thermal insulation by preheating either or both of the reactants by the use of electrical heaters, auxiliary fuel gas, etc.

The invention does not depend on whether or not the oxygen introduced for combustion is in admixture with nitrogen, such as in the case of air. However, air as the source of oxygen is not preferred where the chlorine is to be recycled for chlorination purposes as the nitrogen in the air acts as an inert diluent which generally must be ultimately removed. Thus pure oxygen is preferred. The invention does not depend on the precise amount of oxygen introduced or on the presence or absence of inert gas.

The invention will be further illustrated with reference to the drawing, which illustrates schematically apparatus in which the process may be performed.

Example 1

The following illustrates the production, according to the present invention, of iron oxide and chlorine from a solid mixture of ferric chloride and ferrous chloride containing a small amount of particulate ferrotitaniferous material. Such a mixture is obtained from the first separation stage of the off-gas resulting from the chlorination of ilmenite ore by the method of Nelson et al. U.S. Patent No. 2,849,083 granted on August 28, 1959. The disclosure of the method and materials of the said patent is incorporated herein by reference.

The mixture has the following analysis:

| Component: | Percent by weight |
|---|---|
| $FeCl_3$ | 80.5 |
| $FeCl_2$ | 8.3 |
| $CaCl_2$, $MgCl_2$, $AlCl_3$, $TiCl_4$ | Trace |
| Ilmenite | 7.8 |
| Coke | 3.3 |
| Total | 99.9 |

The apparatus used involves a pressure melting pot leading to a gas combustion apparatus, through a filter system and a flowmeter, substantially as shown in the drawing.

The melting pot has a capacity of 15 gal. (2 cu. ft.). It is provided with a star feeder, a liquid level sighting tube, and four bayonet electric heaters of 5 kw. each. The melting pot is also provided with an outlet for coke impurity at the top part of the ferric chloride level, an intermediate withdrawal point for the molten ferric chloride, and a bottom withdrawal line for the $TiO_2$ impurity.

The combustion apparatus consists of a vertical reactor tube of firebrick, 6″ in diameter and 78″ long, closed at its upper end, and a discharge pipe 6″ in diameter which runs from the top of the reactor tube diagonally downwards at an angle of 45°, terminating in a gas analysis system. The bottom is closed with a plug which contains one orifice for the introduction of the liquid $FeCl_3$ mixture and another for the introduction of oxygen. Electrical heaters are positioned about the reactor and take-off tube to maintain the walls 25° C. above the temperature of the combustion mixture in contact therewith.

The apparatus is prepared for combustion by closing all valves and feeding the ferric chloride mixture through the star feeder until the pot is two-thirds full, and melting the mixture by means of the electric heaters. All of the $FeCl_2$ dissolves in the liquid $FeCl_3$.

The contents of the melting pot are liquid at 350° C. A pressure of 22 lb./in.$^2$ is maintained thereafter by control of the temperature. This pressure is sufficient to cause the liquid discharge from the melting pot to flow through the filter and into the combustion vessel.

The temperature at which the mixture should be discharged from thre liquefaction chamber is determined by placing a small amount in a sealed glass tube, immersing the tube in a fused metal at 350° C. until the contents of the tube had been uniformly heated, withdrawing the tube and shaking the tube to estimate the viscosity of the contents. When the contents are fluid, it indicates a suitable temperature.

The combustion apparatus is preheated to 745° C. by means of the electric heaters. Oxygen at room temperature is supplied to the reactor at the rate of 14.5 lb./hr. and the liquid filtered $FeCl_3$-$FeCl_2$ mixture is supplied at the rate of 167 lb./hr. These rates of feed supply ⅜ mol of $O_2$ per mol of $FeCl_3$. The pressure of the molten $FeCl_3$-$FeCl_2$ mixture at the reactor is 9 lb./in.$^2$ gauge and its temperature is 345° C. The coke impurity is withdrawn from the liquefaction chamber at a rate of 6.24 lb./hr., and the $TiO_2$ impurity at the rate of 14.8 lb./hr.

The reaction proceeds to an equilibrium, about 50% of the iron chloride being converted to iron oxide and chlorine with substantially complete utilization of the oxygen.

We claim:

1. A method of purifying iron chloride contaminated with solid carbonaceous material and titanium dioxide containing material which comprises melting the iron chloride at a temperature of about 305° C. to 475° C., allowing said melted iron chloride to stand until a significant amount of said solid carbonaceous material migrates to the upper part thereof and a significant amount of said titanium dioxide containing material migrates to the lower part thereof, and removing the contaminates which have thus migrated from the melted iron chloride.

2. A method which comprises melting ferric chloride contaminated with solid carbonaceous material and titanium dioxide containing material at a temperature of about 305° C. to 475° C., allowing the melted ferric chloride to stand until a significant amount of said solid carbonaceous material migrates to the upper part thereof and a significant amount of said titanium dioxide containing material migrates to the lower part thereof, withdrawing ferric chloride of reduced contaminate content from the middle part of the melted body of ferric chloride and charging the same to an oxidation zone wherein it is oxidized by means of oxygen to produce a reaction product containing chlorine and iron oxide.

3. In a process wherein an iron-containing titanium dioxide material is chlorinated by contacting it with chlorine in the presence of solid carbonaceous material at a chlorination temperature to produce titanium tetrachloride and a solid residue of iron chloride contaminated with titanium dioxide containing material and solid carbonaceous material, the method of purifying said solid residue for reuse in the chlorination process which comprises melting the solid residue at a temperature of about 305° C. to 475° C., allowing the melted residue to stand until a significant amount of said solid carbonaceous material migrates to the upper part thereof and a significant amount of the titanium dioxide containing material migrates to the lower part thereof, withdrawing said solid carbonaceous material and said titanium dioxide containing material from the melted residue, and recycling the same to the chlorination zone thereby improving the ore and coke utilization in said chlorination zone.

4. The method of claim 3 being further characterized by withdrawing melted iron chloride from the middle part of the melted body and passing the same to an oxidation zone wherein the same is oxidized to produce an oxidation product containing chlorine and iron oxide separating the chlorine from the oxidation product and recycling the same to the chlorination zone for reuse therein.

5. A method of purifying ferric chloride containing ferrous chloride and contaminated with solid carbonaceous material and titanium dioxide containing material which comprises heating said ferric chloride to a temperature of about 305° C. to 475° C. where said ferric chloride and ferrous chloride are melted and form a homogenous mixture and the contaminates are present as solids, allowing the melted iron chlorides to stand until a significant amount of said solid carbonaceous material migrates to the upper part of the melted iron chlorides and a significant amount of said titanium dioxide containing material migrates to the lower part thereof, and withdrawing said contaminates from the upper and lower parts of the melted iron chlorides.

6. A method which comprises melting a solid mixture of ferric chloride and ferrous chloride contaminated with a solid carbonaceous material and titanium dioxide containing material at a temperature of about 305° C. to 475° C., allowing the melted mixture to stand until a significant amount of the solid carbonaceous material migrates to the upper part thereof and a significant amount of the titanium dioxide containing material migrates to the lower part thereof, thereby forming a melted iron chloride of reduced amount of contaminates, passing the melted iron chloride of reduced contaminates to an oxidation zone wherein it is oxidized by means of oxygen to produce iron oxide and chlorine.

7. In a process wherein an iron-containing titanium dioxide material is chlorinated by contacting it with chlorine in the presence of carbonaceous material at a chlorination temperature to produce titanium tetrachloride and a solid residue including a ferric chloride-ferrous chloride mixture contaminated with solid carbonaceous material and titanium dioxide material, the method of purifying said solid residue for reuse in the chlorination process which comprises melting said solid residue at a temperature of amount 305° C. to 475° C., allowing the melted residue to stand until a significant amount of said solid carbonaceous material migrates to the upper part thereof and a significant amount of said titanium dioxide containing material migrates to the lower part thereof and thereby forming a melted iron chloride of reduced amount of contaminates, passing the melted iron chloride of reduced contaminates to an oxidation zone wherein it is oxidized by means of oxygen to produce iron oxide and chlorine, separating said chlorine from said iron oxide and returning said chlorine to the chlorination process.

8. The method of claim 7 being further characterized by withdrawing the contaminates of said solid carbonacous material and titanium dioxide containing material from the melted residue and returning the same to the chlorination process, thereby improving the ore and coke utilization in said chlorination process.

References Cited by the Examiner
UNITED STATES PATENTS

| | | | |
|---|---|---|---|
| 1,845,342 | 2/1932 | Saklatwalla | 23—87 X |
| 2,657,976 | 11/1953 | Rowe et al. | 23—85 |

OTHER REFERENCES

Lawson and Nielsen book "Prep. of Single Crystals," 1958 Ed., pages 58 and 59, Buttersworths Scient. Pub., London.

MAURICE A. BRINDISI, *Primary Examiner*.